United States Patent
Kusubashi

(10) Patent No.: US 7,277,520 B2
(45) Date of Patent: Oct. 2, 2007

(54) ELECTRONIC APPARATUS HAVING A COMMUNICATION DEVICE

(75) Inventor: Takashi Kusubashi, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 772 days.

(21) Appl. No.: 10/717,079

(22) Filed: Nov. 19, 2003

(65) Prior Publication Data
US 2004/0174249 A1 Sep. 9, 2004

(30) Foreign Application Priority Data
Mar. 5, 2003 (JP) .............................. 2003-058496

(51) Int. Cl.
*H04L 23/00* (2006.01)
(52) U.S. Cl. ................. 375/377; 375/340; 340/870.16; 340/500; 340/539.1; 340/540; 709/225; 709/227; 709/229
(58) Field of Classification Search ................ 375/324, 375/340, 377; 340/870.16, 870.19, 500, 340/516, 539.1, 540; 713/201, 202; 709/225, 709/227, 229
See application file for complete search history.

(56) References Cited

U.S. PATENT DOCUMENTS

| | | | | |
|---|---|---|---|---|
| 6,449,272 B1 * | 9/2002 | Chuah et al. | ................ | 370/389 |
| 6,470,453 B1 * | 10/2002 | Vilhuber | ......................... | 726/4 |
| 6,842,107 B2 * | 1/2005 | Takemura et al. | ..... | 340/286.02 |
| 7,099,653 B2 * | 8/2006 | Creamer et al. | ............ | 455/410 |
| 2002/0068610 A1 | 6/2002 | Anvekar et al. | | |
| 2002/0111140 A1 | 8/2002 | Kim et al. | | |
| 2003/0032419 A1 | 2/2003 | Shibasaki et al. | | |

FOREIGN PATENT DOCUMENTS

| | | |
|---|---|---|
| EP | 1267523 A | 12/2002 |
| JP | 11-073192 A | 3/1999 |
| JP | P2002-261879 | 9/2002 |
| JP | 2002-291066 A | 10/2002 |
| JP | P2002-325081 | 11/2002 |

OTHER PUBLICATIONS

"Specification of the Bluetooth System" v1.0 B Dec. 1, 1999—Bluetooth Specification Version 1.0B.—Bluetooth Security Nov. 29, 1999—pp. 149-178.

Haartsen J C : "The Bluetooth Radio System" IEEE Personal Communications, IEEE vol. 7, No. 1, Feb. 2000, pp. 28-36, XP000908653 ISSN : 1070-9916.

* cited by examiner

*Primary Examiner*—Dac V. Ha
(74) *Attorney, Agent, or Firm*—Foley & Lardner LLP

(57) ABSTRACT

An electronic apparatus has a communication device, memory which stores identification information for identifying an external device having been previously connected to the communication device, an operation switch, a connection establishing unit for establishing connection with the external device designated by identification information stored in said memory in response to the operation of said operation switch, and a receiver for receiving data transmitted from the external device with which the connection is established by the connection establishing unit via the communication device.

16 Claims, 7 Drawing Sheets

| Communication mode | Streaming | CODEC |
|---|---|---|
| Audio mode | One direction (Transport channel number=1) | SBC |
| Conversation mode | Bidirectional (Transport channel number=2) | $\mu$law |
FIG. 9
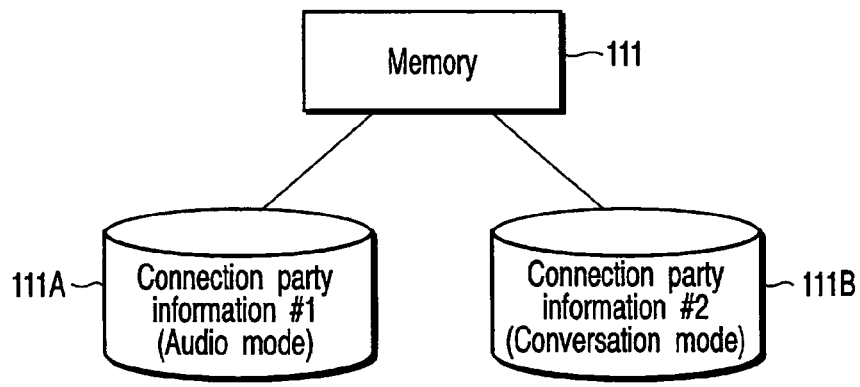
FIG. 10
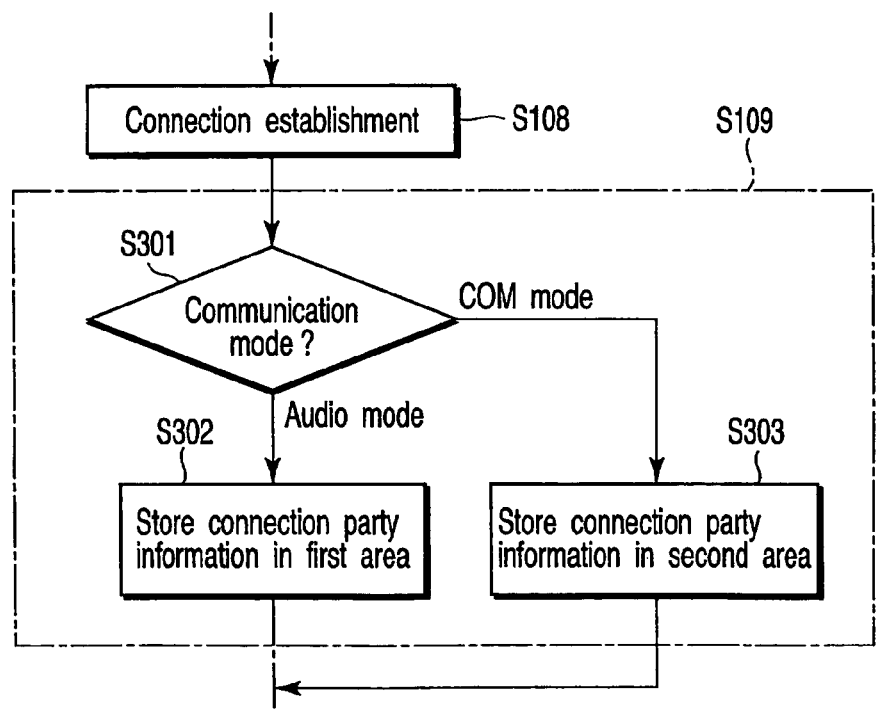
FIG. 11

ELECTRONIC APPARATUS HAVING A COMMUNICATION DEVICE

CROSS-REFERENCE TO RELATED APPLICATIONS

This application is based upon and claims the benefit of priority from Japanese Patent Application No. 2003-58496, filed Mar. 5, 2003, the entire contents of which are incorporated herein by reference.

BACKGROUND OF THE INVENTION

1. Field of the Invention

This invention relates to an electronic apparatus having a communication device that communicates with another communication device, such as a headset.

2. Description of the Related Art

In recent years, Bluetooth® has drawn attention as a wireless communication technique. Bluetooth® is a short-distance wireless communication technique suitable for a mobile device and is low in cost and power consumption. It's primary application is for interconnecting various information devices owned by each user at least some of which are portable devices. Since the devices are wirelessly connected to each other, it is possible to connect various devices freely, simply, and easily as compared with a conventional wired connection.

As one system using wireless communication, Japanese Patent Application Publication (KOKAI) No. 2002-261879 discloses a system for making communication between a headset having a wireless communication function and a master terminal such as a mobile communication terminal. This system has a function of automatically registering an ID of the wireless headset in the mobile communication terminal such that the mobile communication terminal may establish a link with the wireless headset.

However, the system disclosed in the above-identified reference assumes that the headset is controlled from the mobile communication terminal, and does not disclose a mechanism for requesting data transmission from the headset to the mobile communication terminal.

Generally, since the devices are wirelessly connected using the Bluetooth®, it is required that a user himself/herself directly inputs device identification information such as a device address of the connection party or the user selects a connection party device from a list of devices displayed as a result of device discovery.

However, in an electronic apparatus such as a headset, it is difficult to provide many buttons or to provide a display unit for displaying a device address list due to restrictions such as its shape, its size and the like.

Therefore, in order to listen to audio data such as music transmitted by a wireless signal from an external device such as a music player or a personal computer using the headset, the user needs to operate the external device each time the user wants to listen to the music.

BRIEF SUMMARY OF THE INVENTION

Embodiments of the present invention provide an electronic apparatus having a communication device.

According to an embodiment of the present invention, an electronic apparatus has a memory which stores identification information for identifying an external device having been previously connected to the communication device, an operation switch, a connection establishing unit for establishing connection with an external device designated by identification information stored in said memory in response to the operation of the operation switch, and a receiving unit for receiving data transmitted from the external device with which the connection is established by the connection establishing unit via the communication device.

Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 9 is a diagram for explaining a direction of streaming and a type of codec in the audio mode and in the conversation mode, respectively according to the second embodiment;

FIG. 10 is a diagram showing a memory storing a two connection party information provided in the headset according to the second embodiment;

FIG. 11 is a flowchart showing a procedure of a connection party information storage processing performed by the headset according to the second embodiment.

DETAILED DESCRIPTION

Preferred embodiments according to the present invention will be described hereinafter with reference to the accompanying drawings.

Figure 1:
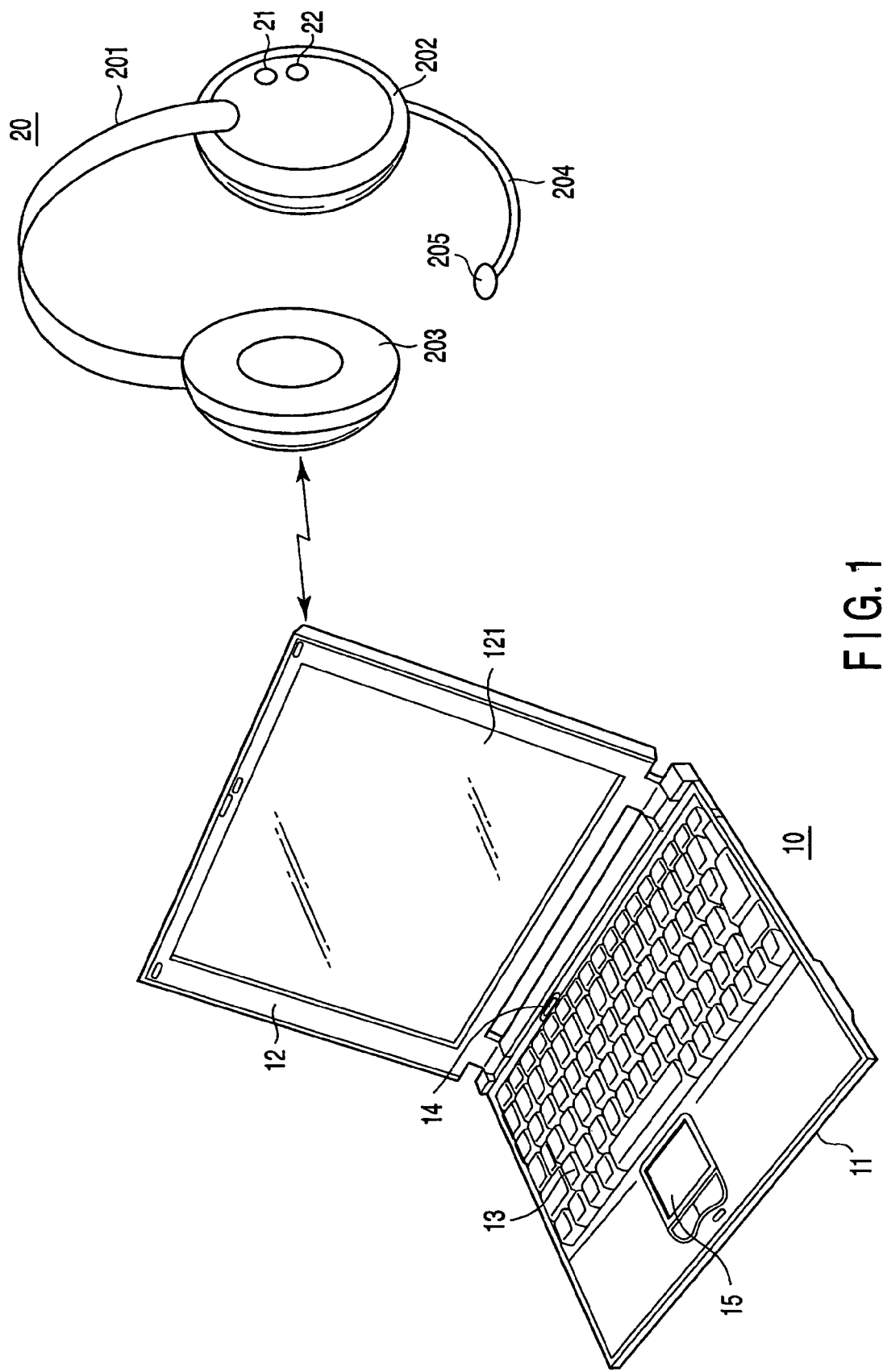
FIG. 1 is a perspective view showing a headset and a portable computer which communicates with the headset over wireless connection according to a first embodiment of the present invention.

FIG. 1 shows a notebook type personal computer 10 (hereinafter "computer") as an external device, and a wireless headset 20 (hereinafter "headset") as an electronic apparatus. The headset 20 is capable of receiving and reproducing a stream of content data such as music transmitted by a wireless signal from the computer 20.

The headset 20 is an output unit for reproducing audio data such as music or speech transmitted by a wireless signal from the computer 10 and generating sounds corresponding to the audio data. The wireless communication between the headset 20 and the computer 10 is realized in conformity to the Bluetooth® standard.

Bluetooth®, Advanced Audio Distribution Profile (hereinafter "A2DP") defines a profile for performing streaming reproduction of audio data such as music or the like. The computer 10 functions as a transmitting source device for transmitting audio stream data, which is referred to as a source device in the Bluetooth® specification. On the other hand, the headset 20 functions as a device for receiving audio stream data, which is referred to as a sink device in the Bluetooth® specification.

The headset 20 has a microphone 205, and may transmit a user's speech signal input from the microphone 205 to the computer 10 by a wireless signal. The headset 20 is constituted to be mountable on the head of the user. A main body of the headset 20 is configured of a headband 201 and two ear pads 202 and 203 provided at both ends of the headband 201. The two ear pads 202 and 203 have a speaker therein, respectively, and the ear pads 202 and 203 function as a speaker unit, respectively.

In a state where the headset 20 is mounted on the head of the user, the two ear pads 202 and 203 cover the right and left ears of the user, respectively. One end of a microphone arm 204 is mounted on the pad 202, and the other end thereof is provided with the microphone 205.

The ear pad 202 is further provided with a power button 21 and a play button 22. The power button 21 is an operation switch for turning ON/OFF the headset 20. The play button 22 is an operation switch for controlling audio reproducing operation.

When the headset 20 is powered on, the headset 20 enters a standby state for waiting for a connection request from other device. When a connection request from the computer 10 is received in the standby state, wireless connection is established between the computer 10 and the headset 20 under control of the computer 10. Then, a streaming processing for transmitting a stream of audio data from the computer 10 to the headset 20 is started in response to a streaming start command transmitted from the computer 10 to the headset 20. The headset 20 reproduces the stream of the audio data while receiving the same.

Further, the headset 20 stores identification information for identifying the computer 10 wirelessly connected to the headset 20 as information indicating the next connection party. Address information allocated to the external device, i.e. computer 10 in this embodiment, wirelessly connected to the headset 20 is used as the identification information. In this embodiment, the address information is a Bluetooth® device address specific to a wireless communication device incorporated in the computer 10. The stored identification information is used when audio reproduction is performed the next time.

In other words, when the play button 22 is operated by the user in the standby state, the headset 20 uses the stored identification information to establish the wireless connection with the computer 10, and transmits a streaming start command to the computer 10 as an audio data transmission request. Thereby, the streaming processing for transmitting a stream of audio data from the computer 10 to the headset 20 is started. The headset 20 reproduces the stream of the audio data while receiving the same.

The Play button switch may also serve as a stop switch in a construction that the play and stop functions are alternately carried out upon successive depressions of the switch (such as a toggle switch function). Alternatively, a separate stop switch may be provided.

The power button 21 and the play button 22 may also be realized by a single operation switch. In this case, in response to the power-on, the headset 20 determines whether or not the identification information is stored. When the identification information is not stored, the headset 20 enters the standby state. On the other hand, when the identification information is stored, the headset 20 establishes the wireless connection with the computer 10 designated by the stored identification information, and transmits a streaming start command to the computer 10 as an audio data transmission request. Further, a stop function may be combined with the same power-on/play switch such that one function (power-on/play/stop) is carried out with every third depression of the single switch.

The computer 10 may be a portable information processing device that may be driven by a battery, and is configured with a computer main body 11 and a display unit 12. The display unit 12 is composed of a Liquid Crystal Display 121 (hereinafter "LCD") which is positioned substantially at the center of the display unit 12.

The display unit 12 is rotatably mounted between an open position and a closed position relative to the computer main body 11. The computer main body 11 has a thin box-like casing, which is provided with a keyboard 13, a power button 14 for turning ON/OFF the computer 1, a touch pad 15 as a pointing device, and the like at its top face.

A wireless communication device is incorporated in the computer main body 11. The computer 10 may make wireless communication with the headset 20 by this wireless communication device. The wireless communication device is configured to establish wireless communication in conformity to the Bluetooth® standard.

A wireless utility program is installed in the computer 10, and controls the wireless communication between the computer 10 and the headset 20.

The wireless utility program performs a device discovery processing for detecting wirelessly communicable devices which are present around the computer 10, and displays a list of the devices detected by the device discovery processing on the LCD 121. The user may wirelessly connect the computer 10 to the headset 20 by selecting the headset 20 from the list of the detected devices.

Figure 2:
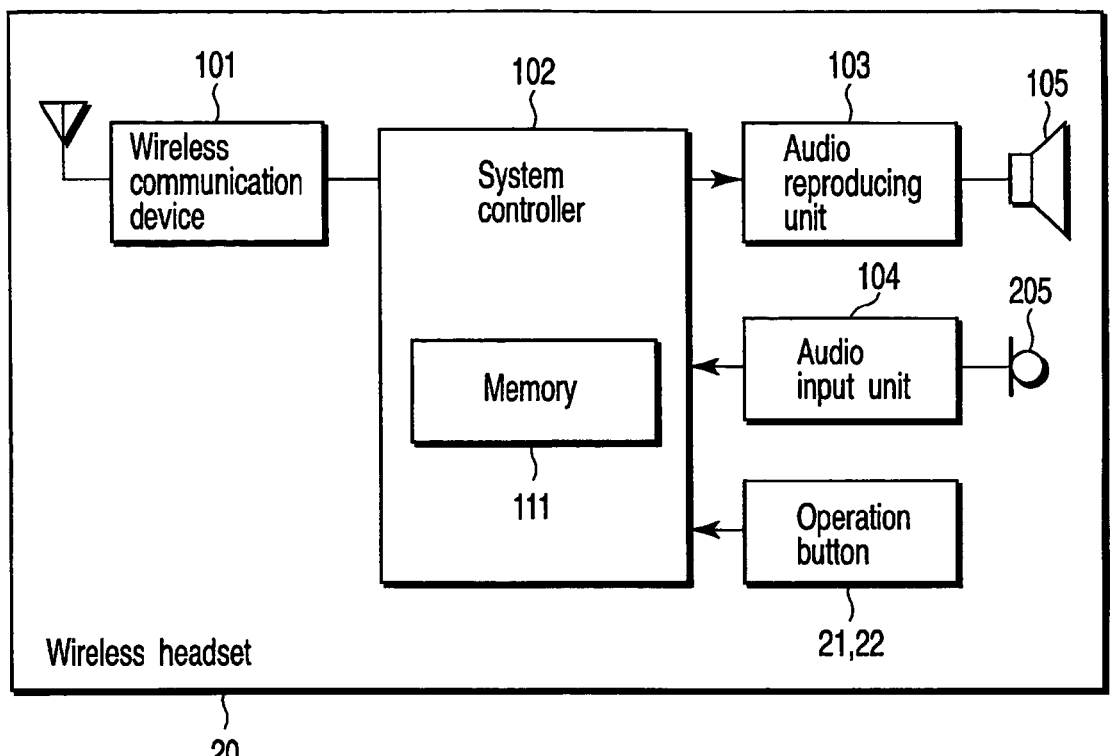
FIG. 2 is a block diagram showing the headset in the first embodiment.

A configuration of the headset 20, as shown in FIG. 2, includes a wireless communication device 101, a system controller 102, an audio reproducing unit 103, and an audio input unit 104.

The system controller 102 is a processor provided for controlling the operation of the headset 20, and controls the wireless communication device 101, the audio reproducing unit 103, and the audio input unit 104, respectively. The system controller 102 has the above source function of A2DP in order to reproduce audio data such as music transmitted by a wireless signal from the computer 10. Further, the system controller 102 also has the above sink function of A2DP in order to transmit a user's speech signal input from the microphone 205 to the computer 10 as audio data.

The system controller 102 has a memory 111 which may be a non-volatile memory or the like, and which stores connection party information. The connection party information stored in the memory 111 includes identification information of the external device previously wirelessly connected to the headset 20.

The wireless communication device 101 makes wireless communication according to a procedure in conformity to the Bluetooth® standard. The audio reproducing unit 103 performs a data reproducing processing for streaming reproduction, where a stream of audio data transmitted from the computer 10 is converted into an electric signal that may be output as a sound from the speakers 105 incorporated in the respective pads 202 and 203 while being received via the wireless communication device 101 and the system controller 102.

The audio input unit 104 converts a speech signal input from the microphone 205 from an analog signal into a digital signal, and outputs it to the system controller 104.

Figure 3:
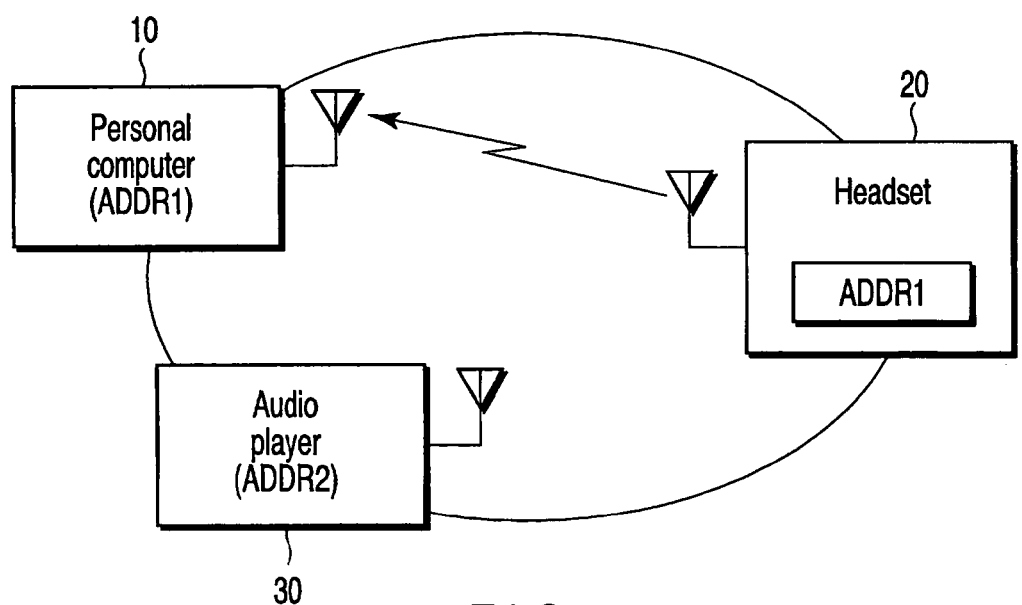
FIG. 3 is a diagram showing a state where the headset uses identification information stored in a memory to start communication with an external device according to the first embodiment.

FIG. 3 shows a state where the headset 20 uses the identification information stored in the memory 111 to start communication with the external device.

As shown in FIG. 3, the computer 10 and an audio player 30 are present around the headset 20. The audio player 30 is a device capable of transmitting audio data by a wireless signal to the headset 20 in a manner similar to the computer 10.

If the device previously wirelessly connected to the headset 20 is the computer 10, the identification information stored in the memory 111 of the headset 20 indicates identification information (ADDR1) of the computer 10. If the play button 22 is operated, the headset 20 establishes the connection with the computer 10 designated by the ADDR1, and starts communication for receiving content data from the computer 10.

Further, if the device previously wirelessly connected to the headset 20 is the audio player 30, the identification information stored in the memory 111 of the headset 20 indicates identification information (ADDR2) of the audio player 30. When the play button 22 is operated, the headset 20 establishes connection with the audio player 30 designated by the ADDR2, and starts communication for receiving content data from the audio player 30.

Next, the operations performed by the external device and the headset 20 will be described with reference to flowcharts in FIGS. 4 and 5.

Figure 4:
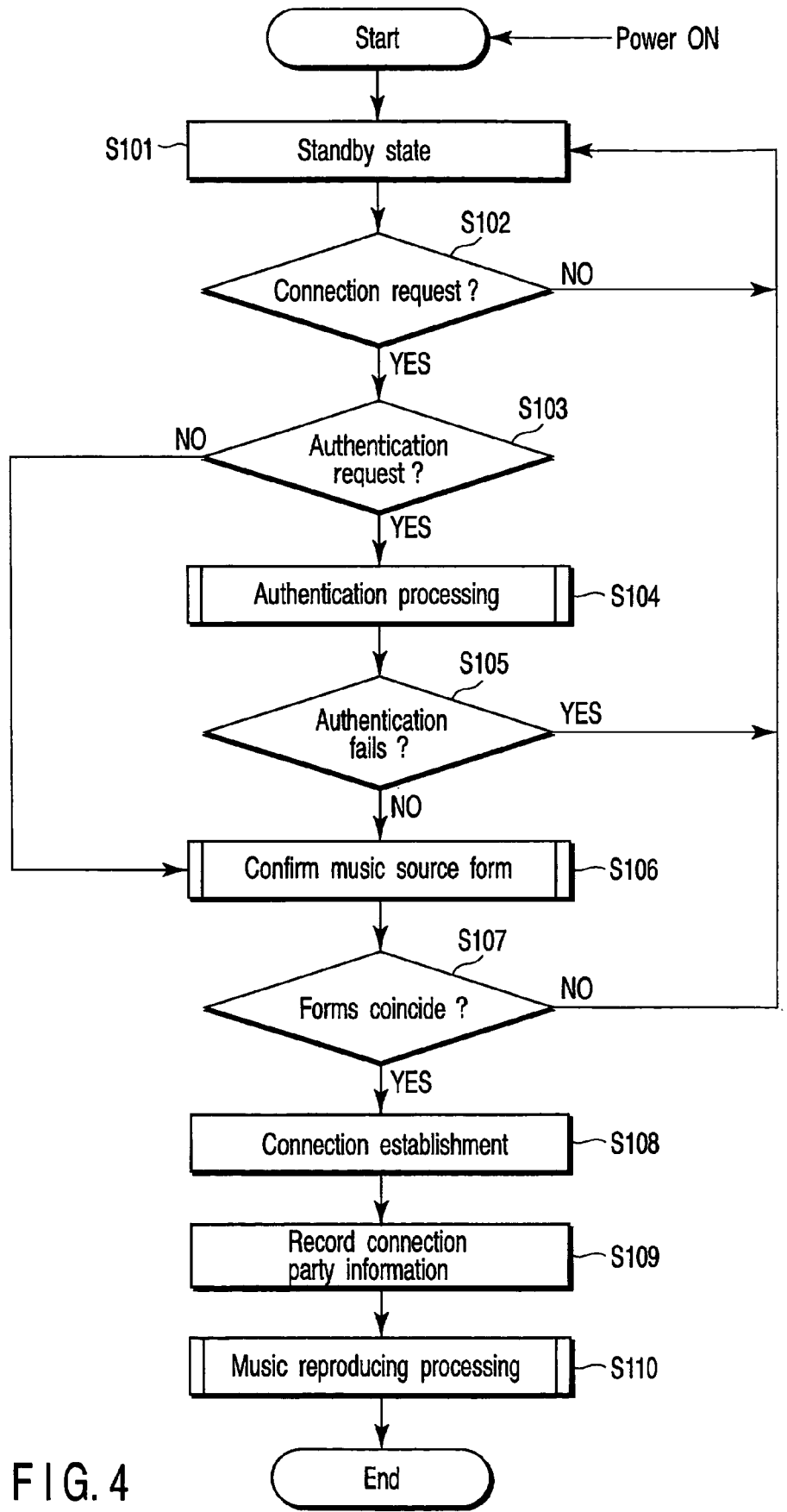
FIG. 4 is a flowchart showing a procedure of a processing performed by the headset when a connection request is received from an external device according to the first embodiment.

FIG. 4 shows operation of the headset 20 when a connection request is received from the external device. In the case of FIG. 4, the external device, e.g., computer, acts as a master for the purpose of establishing communication with the headset.

When the headset 20 is powered on by an operation of the power button 21, the headset 20 enters the standby state (step S101). In the standby state, the wireless communication device 101 of the headset 20 waits for a connection request from the external device.

When the computer 10 transmits a connection request to the headset 20 the connection request is received by the wireless communication device 101. When the connection request is received by the wireless communication device 101 (YES in step S102), the headset 20 performs an authentication processing with the computer 10 as needed (steps S103 and S104). The authentication processing is the processing for confirming that the headset 20 and the computer 10 are devices into which the same password has been input, and is referred to as a pairing in the Bluetooth® standard.

In the authentication processing which is called "pairing" in the Bluetooth® standard, each other's device addresses and passwords are exchanged between the headset 20 and the computer 10, thereby a determination is made as to whether or not they are the devices into which the same password has been input. When this authentication "pairing" is successfully performed, the headset 20 and the computer 10 hold the same secret key which is called a "link key". Thereby, the pairing between the headset 20 and the computer 10 is completed.

The devices that have once succeeded in the pairing may authorize each other only by the exchange of the "link key".

When the authentication is successfully performed (NO in step S105), the headset 20 performs a processing for confirming a data form, e.g. music source form, of audio data that may be handled by both the computer 10 and the headset 20 in response to the request from the computer 10 (step S106).

In this step S106, a determination is made as to whether or not the data form, including CODEC which is named from COmpression/DECompression, and the sampling frequency, of the audio data such as music transmitted from the computer 10 coincides with a data form including CODEC, and sampling frequency, that may be reproduced by the headset 20, in particular, the system controller 102, and the audio reproduction unit 103. Specifically, the headset 20 determines whether or not a type of an encoding scheme applied to the content data to be transmitted and a value of the sampling frequency used in the encoding, which are notified from the computer 10, are a type of the encoding scheme and a value of the sampling frequency that can be decoded by the headset 20.

When a data form capable of being commonly handled by the computer 10 and the headset 20 is not present, that is, when the data form of the audio data transmitted from the computer 10 does not coincide with the data form capable of being reproduced by the headset 20 (NO in step S107), the connection fails and the headset 20 returns to the standby state.

When the data form of the audio data transmitted from the computer 10 coincides with the data form capable of being reproduced by the headset 20 (YES in step S107), a connection establishment processing for establishing wireless connection between the computer 10 and the headset 20 is performed (step S108). The headset 20 stores the identification information, i.e. device address, of the computer 10 wirelessly connected to the wireless communication device 101 of the headset 20 in the memory 111 as connection party information indicating the next connection party (step S109). When the identification information has been previously stored in the memory 111, the identification information of the computer 10 is overwritten on the existing identification information so that update of the identification information is performed.

Thereafter, the computer 10 transmits a streaming start command to the headset 20, and starts a processing for transmitting a stream of audio data such as music to the headset 20. The headset 20 receives the stream of the audio data, and reproduces the same (step S110).

Figure 5:
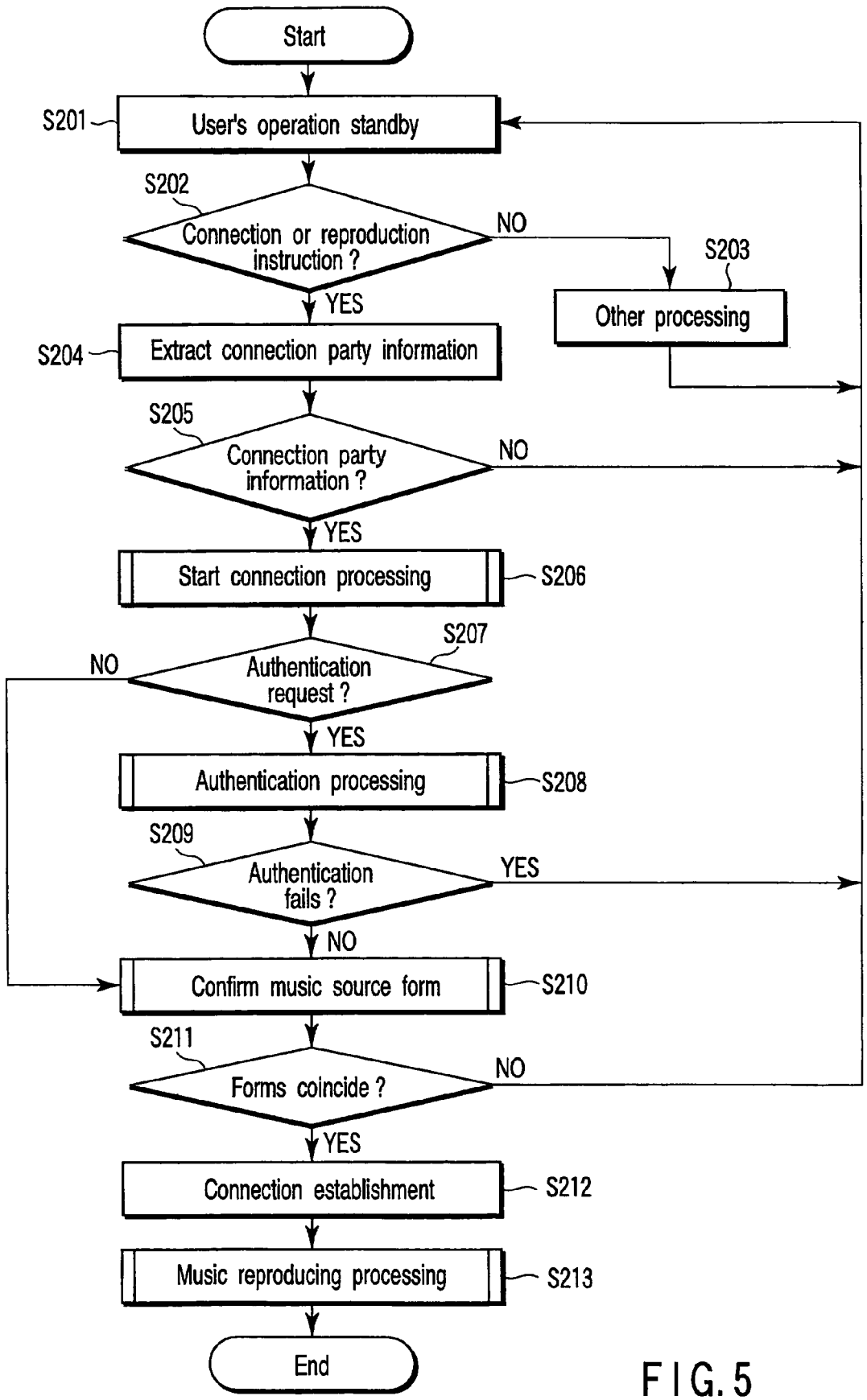
FIG. 5 is a flowchart showing a procedure of a processing performed by the headset when a reproduction button is operated according to the first embodiment.

FIG. 5 shows an operation performed by the headset 20 when the play button 22 is operated by the user.

In the standby state, the headset 20 not only waits for an arrival of a connection request from the external device but also waits for an operation of the play button 22 by the user (steps S201 and S202). Until the user operates the play button 22 (NO in step S202), the headset 20 performs a standby processing (step S101) in FIG. 4 (step S203).

If the play button 22 is operated in the standby state (YES in step S202), the headset 20 performs a processing for extracting connection party information, i.e. identification information, from the memory 111 (step S204). When the connection party information is not stored in the memory 111 (NO in step S205), the headset 20 returns to the user's operation standby state in step S201.

If the connection party information is stored in the memory 111 (YES in step S205), the headset 20 transmits a connection request to the external device designated by the identification information, i.e. device address, acquired from the memory 111 to start a processing for connecting to the external device designated by the device address (step S206). A connection request packet includes a device address for designating the connection party. For example, when the identification information stored in the memory 111 is the device address ADDR1 of the computer 10, a connection request packet including the ADDR1 is issued.

When the computer 10 receives the connection request, the computer 10 returns acknowledge to the headset 20. The headset 20 performs the authentication processing with the computer 10 as needed (steps S207 and S208). If the authentication is successfully performed (NO in step S209), the headset 20 performs a processing for confirming a data form, i.e. music source form, of audio data that may be handled by both the computer 10 and the headset 20 (step S210).

If the data form of the audio data transmitted from the computer 10 coincides with the data form capable of being reproduced by the headset 20 (YES in step S211), the headset 20 performs the connection establishment processing for establishing wireless connection with the computer 10 (step S212). After the wireless connection with the computer 10 is established, the headset 20 transmits a streaming start command to the computer 10 as a content data transmission request, and instructs the computer 10 to transmit a stream of audio data such as music. Thereby, a processing for transmitting a stream of audio data such as music from the computer 10 to the headset 20 is started. The headset 20 receives the stream of the audio data, and reproduces the same (step S213).

If the data form of the audio data transmitted from the computer 10 does not coincide with the data form capable of being reproduced by the headset 20 (NO in step S211), the headset 20 returns to the user's operation standby state in step S201.

As described above, the headset 20 according to the present embodiment has the function of storing the identification information for identifying the external device wirelessly connected to the wireless communication device 101 therein, and automatically starting the communication for receiving content data from the external device designated by the stored identification information. Thus, the user has only to operate the external device to connect to the headset 20 once, and subsequently the user may start communication for receiving content data from the external device without operating the external device itself the next time. Of course, the external device must be in the one state and ready to transmit the audio data.

Further, since the storage of the identification information of the external device is performed after it is confirmed that the external device may perform stream transmission of the audio data by the authentication processing and the music source form confirmation processing, it is possible to prevent the headset 20 from being carelessly connected to a device which cannot perform the stream transmission of the audio data in response to the operation of the play button 22.

Figure 6:
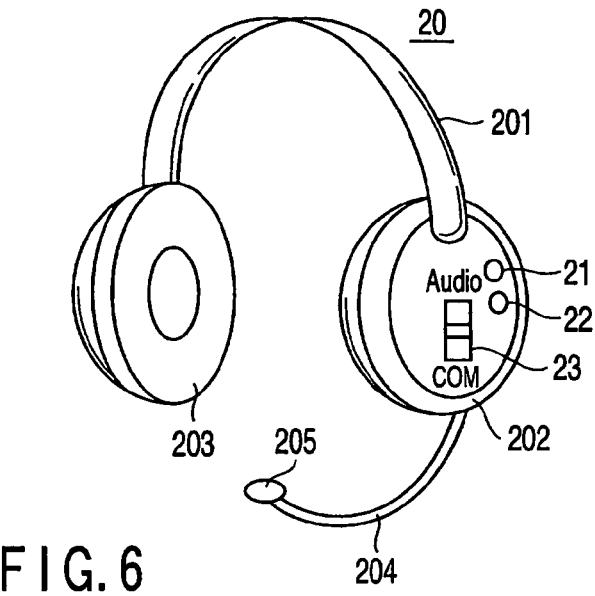
FIG. 6 is a perspective view showing a headset according to a second embodiment of the present invention.

FIG. 6 shows a second embodiment of the headset 20 according to the present invention.

The headset 20 in FIG. 6 additionally includes a mode changeover switch 23 in addition to the configuration described with reference to FIGS. 1 and 2. The mode changeover switch 23 is an operation switch for changing over a communication mode to be performed by the headset 20.

The headset 20 has the following two communication modes for making communication with the external device.

One is a communication mode for receiving audio data such as music transmitted from the external device as described above (hereinafter, referred to as "audio mode"), and the other one is a communication mode for transmitting and receiving audio data such as speech to/from the external device (hereinafter, referred to as "conversation mode").

The conversation mode is utilized when the user has an electronic conference with each terminal over the Internet via the computer 10, or uses the headset 20 to operate a speech recognition & synthesis program performed on the computer 10.

Both the audio mode and the conversation mode described above are realized using A2DP. The computer 10 also has the audio mode and the conversation mode described above as the communication modes for making communication with the headset 20. When the headset 20 is set in the audio mode by the mode changeover switch 23, the connection between the computer 10 and the headset 20 is established in the audio mode, and when the headset 20 is set in the conversation mode by the mode changeover switch 23, the connection between the computer 10 and the headset 20 is established in the conversation mode.

Figure 7:
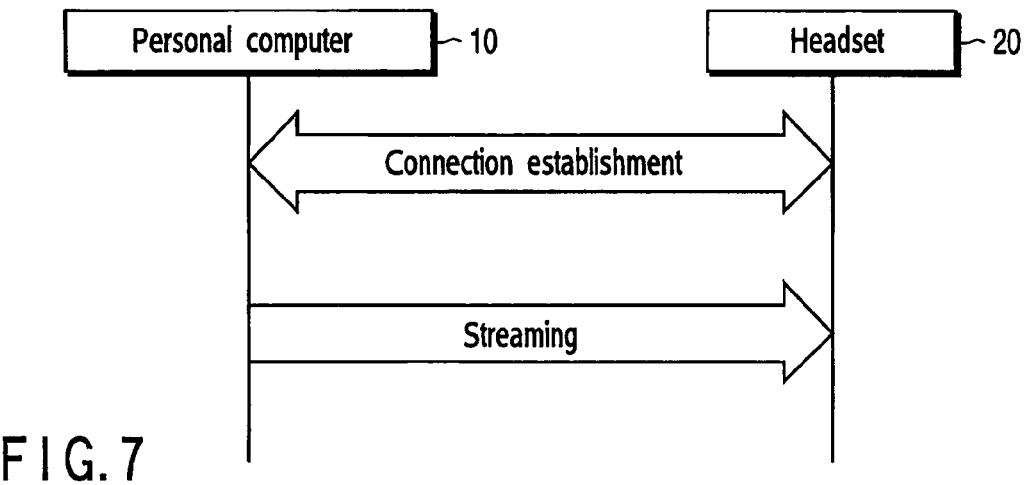
FIG. 7 is a diagram showing a connection establishment processing in a conversation mode performed between the headset and an external device according to the second embodiment.

FIG. 7 shows a state of the connection establishment processing in the audio mode.

The device, which is either the computer 10 or the headset 20, for starting the connection establishment processing, performs a procedure for establishing a one direction channel, called a "transport channel", for transmitting audio data such as music from the computer 10 to the headset 20.

In this connection establishment processing, communication conditions, i.e. CODEC, sampling frequency, and the like, to be used in the audio transmission between the computer 10 and the headset 20 which should function as the stream end points of the transport channel are decided. The computer 10 functions as the source device for transmitting audio data via the established transport channel, and the headset 20 functions as the sink device for receiving the audio data transmitted via the established transport channel.

After the connection establishment processing, a processing for transmitting audio data from the computer 10 to the headset 20, which is called "streaming", is started.

Figure 8:
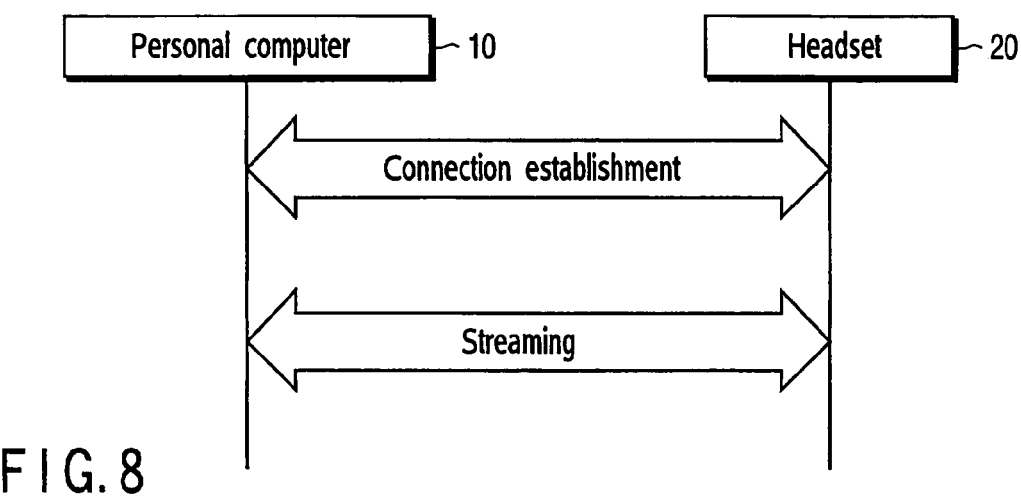
FIG. 8 is a diagram showing a connection establishment processing in an audio mode performed between the headset and en external device according to the second embodiment.

FIG. 8 shows a state of the connection establishment processing in the conversation mode.

The device, which is either the computer 10 or the headset 20, for starting the connection establishment processing performs a procedure for establishing two transport channels for bi-directionally transferring audio data such as a speech signal between the computer 10 and the headset 20.

In this connection establishment processing, communication conditions, such as CODEC, sampling frequency, and the like, to be used in the audio transmission between the computer 10 and the headset 20 are decided for each transport channel.

With respect to one transport channel, the computer 10 functions as the source device for transmitting audio data via the transport channel, and the headset 20 functions as the sink device for receiving the audio data transmitted via the transport channel. With respect to the other transport channel, the headset 20 functions as the source device, and the computer 10 functions as the sink device.

After the connection establishment processing, a processing for transmitting the audio data from the computer 10 to the headset 20 and a processing for transmitting the audio data from the headset 20 to the computer 10 may be simultaneously performed.

FIG. 9 shows correspondence of a direction of streaming and a type of CODEC in each communication mode.

In the audio mode, transmission of the audio data stream is performed only in one direction, and a type of CODEC used in the streaming is, for example, Subband Codec (hereinafter "SBC") which is low-compression. The SBC is a compression encoding/decoding scheme for music data and processing. The reception side may reproduce sufficiently high quality sounds by using the SBC, which a relatively large amount of computation is required. Further, in the audio mode, since the microphone 205 is not used, the transmission of the audio data from the headset 20 to the computer 10 does not occur. Thereby, the headset 20 may decode and reproduce the stream of the audio data such as music received from the computer 10 in real-time even using the SBC having a large amount of computation.

In the conversation mode, the transmission of the audio data stream is bi-directionally performed and a type of the CODEC used in each streaming is, for example, µ-law which is a compression encoding scheme for a speech signal. µ-law requires a smaller amount of computation as compared with the SBC. Thus, the headset 20 may decode and reproduce the stream of the audio data such as a speech signal received from the computer 10 in real-time. At the same time, the headset 20 may compression-encode the speech signal input from the microphone 205 to transmit it to the computer 10 in real-time.

The headset 20 may store the identification information of the previously connected external device in each of the audio mode and the conversation mode.

As shown in FIG. 10, the memory 111 includes a first area 111A for storing the identification information of the previously connected external device in the audio mode therein, and a second area 111B for storing the identification information of the previously connected external device in the conversation mode therein.

In the connection party information storage processing in step S109 in FIG. 4, the identification information is stored in the first area 111A or the second area 111B corresponding to the current communication mode. A procedure of this processing is shown in FIG. 11.

As shown in a flowchart in FIG. 11, after the wireless connection is established between the external device and the headset 20 (step S108), the headset 20 first determines which of the audio mode and the conversation mode is the current communication mode designated by the mode changeover switch 23 (step S301) In the case of the audio mode, the headset 20 stores the identification information of the external device in the first area 111A as the next connection party information in the audio mode (step S302). On the other hand, in the case of the conversation mode, the headset 20 stores the identification information of the external device in the second area 111B as the next connection party information in the conversation mode (step S303).

When the play button 22 is operated, the headset 20 uses the identification information stored in the first area 111A or the second area 111B corresponding to the current communication mode to start the connection with the external device.

Figure 12:
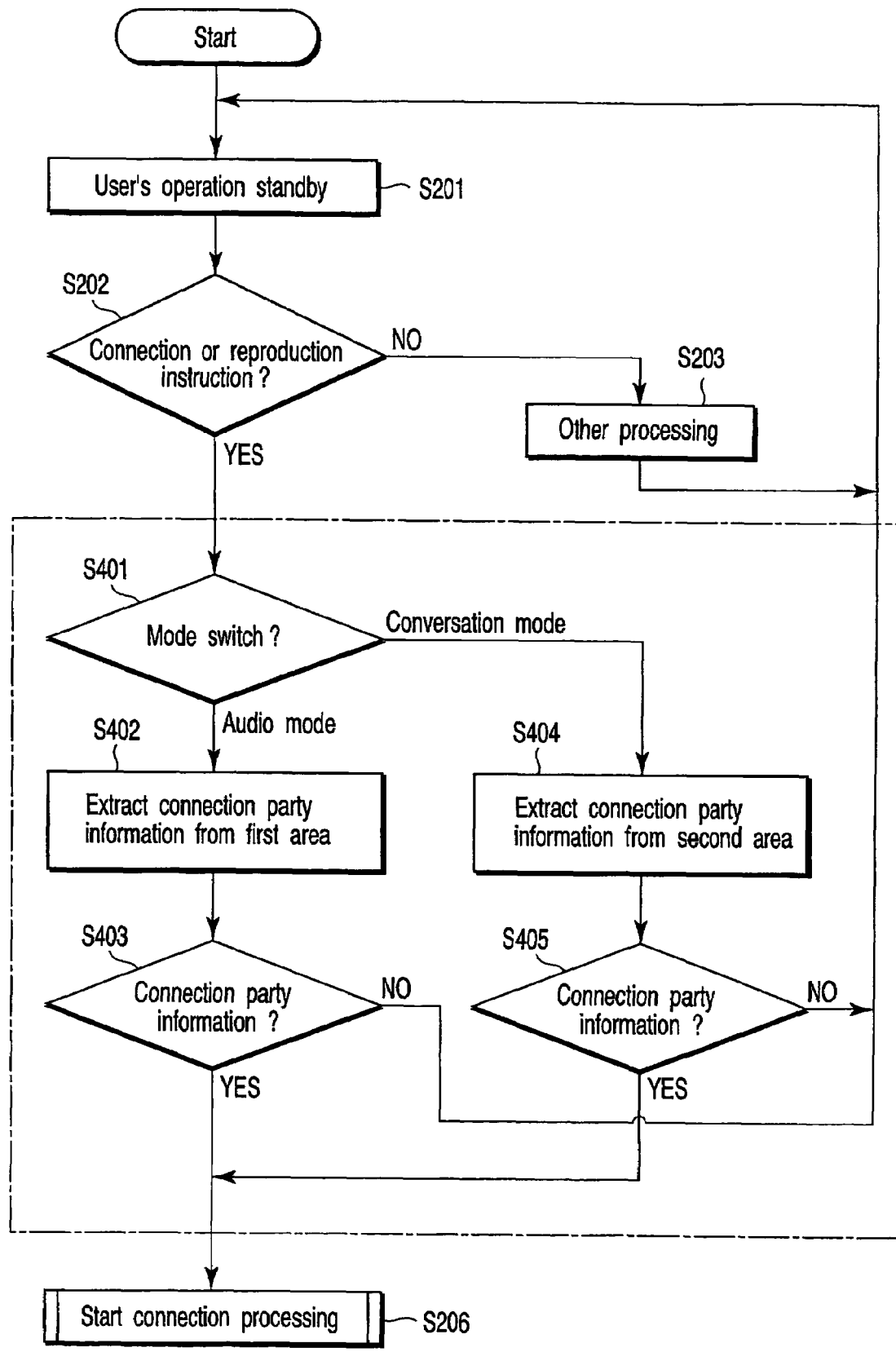
FIG. 12 is a flowchart showing a procedure of a processing performed by the headset when a reproduction button is operated according to the second embodiment.

In other words, as shown in a flowchart in FIG. 12, in response to the operation of the play button 22, the headset 20 first determines which of the audio mode and the conversation mode is the current communication mode designated by the mode changeover switch 23 (step S401).

In the case of the audio mode, the headset 20 performs a processing for extracting the connection party information, i.e. identification information, from the first area 111A (step S402). If the connection party information is not stored in the first area 111A (NO in step S403), the headset 20 returns to the user's operation standby state in step S201. If the connection party information is stored in the first area 111A (YES in step S403), the headset 20 transmits a connection request to the external device designated by the identification information, i.e. device address, acquired from the first area 111A to start the processing for connecting to the external device designated by the device address (step S206).

In the case of the conversation mode, the headset 20 performs a processing for extracting the connection party information, i.e. identification information, from the second area 111B (step S404). When the connection party information is not stored in the second connection party information storage area 111B (NO in step S405), the headset 20 returns to the user's operation standby state in step S201. When the connection party information is stored in the second connection party information storage area 111B (YES in step S405), the headset 20 transmits a connection request to the external device designated by the identification information, i.e. device address, acquired from the second connection party information storage area 111B to start the processing for connecting to the external device designated by the device address (step S206).

From the above processing, it is possible to automatically start the communication with the previously connected external device for each communication mode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An electronic apparatus having a communication device, comprising:
    means for setting the communication device in either one of a first communication mode or a second communication mode for receiving data transmitted from an external device;
    a memory which stores first identification information and second identification information for identifying the external device having been previously connected to the communication device;
    an operation switch;
    means for transmitting a connection request to the external device designated by the first identification information when the communication device is in the first communication mode;
    means for transmitting a connection request to the external device designated by the second identification information when the communication device is in the second communication mode;
    means for establishing connection with the external device designated by either one of the first identification information or the second identification information stored in said memory in response to the operation of said operation switch; and
    means for receiving data transmitted from the external device with which the connection is established by the establishing means via the communication device.

2. An electronic apparatus according to the claim 1, further comprising:
   means for reproducing the data received by the receiving means; and
   means for determining whether or not a data form of a data which may be transmitted by the external device connected to the communication device coincides with a data form of a data which may be reproduced by the reproducing means,
   wherein the memory stores either one of the first identification information or the second identification information under a condition where the data forms coincide with each other.

3. An electronic apparatus according to claim 2, wherein said determining means determines whether or not a type of an encoding scheme applied to data to be transmitted, which type is transmitted from the external device connected to the communication device, is a type of an encoding scheme which may be decoding by the reproducing means.

4. An electronic apparatus according to claim 2, wherein said determining means determines whether or not a type of an encoding scheme applied to data to be transmitted and a value of a sampling frequency used in the encoding, which type and values are transmitted from the external device connected to the communication device, are a type of an encoding scheme and a value of a sampling frequency which may be decoded by said reproducing means.

5. An electronic apparatus according to claim 2, wherein the data transmitted from the external device is audio data, and said reproducing device includes an output unit which outputs sounds corresponding to the audio data.

6. An electronic apparatus according to claim 1, wherein the first and second identification information includes address information allocated to the external device.

7. An electronic apparatus according to claim 1, wherein setting means sets the communication device in either one of a first communication mode for receiving data transmitted from the external device or the second communication mode for bidirectionally transmitting and receiving data between the external device and the communication device.

8. A communication control method for controlling communication made by an electronic apparatus, comprising steps of:
   setting the electronic apparatus in either one of a first communication mode or a second communication mode for receiving data transmitted from an external device;
   storing first and second identification information for identifying the external device which has been previously established a connection with the electronic apparatus;
   inputting an instruction;
   transmitting a connection request to the external device designated by the first identification information when the electronic apparatus is in the first communication mode;
   transmitting a connection request to the external device designated by the second identification information when the electronic apparatus is in the second communication mode;
   establishing connection with the external device designated by either one of the identification information or the second identification information stored in the storage step in response to the instruction; and
   receiving data transmitted from the external device over the established connection.

9. A communication control method according to claim 8, further comprising determining whether or not a data form of data which may be transmitted by the external device connected to the electronic apparatus coincides with a data form of data which may be reproduced by the electronic apparatus,
   wherein the storing step stores either one of the first identification information or the second identification information only where it is determined that the data forms coincides with each other.

10. A communication control method according to claim 9, wherein the determining step determines whether or not a type of an encoding scheme applied to data to be transmitted, which type is transmitted from the external device to the electronic apparatus, is a type of an encoding scheme which may be decoded by the electronic apparatus.

11. A communication control method according to claim 9, wherein the determining step determines whether or not a type of an encoding scheme applied to data to be transmitted and a value of a sampling frequency used in the encoding, which type and sampling are transmitted from the external device to the electronic apparatus, are a type of an encoding scheme and a value of a sampling frequency which may be decoded by the electronic apparatus.

12. A communication control method according to claim 8, wherein the setting step sets the electronic apparatus in either one of a first communication mode for receiving data transmitted from the external device or a second communication mode for bidirectionally transmitting and receiving data between the electronic apparatus and the external device.

13. An electronic apparatus having a communication device, comprising:
   means for setting the communication device in either one of a first communication mode or a second communication mode for receiving data transmitted from an external device;
   a memory which stores first identification information and second identification information for identifying the external device having been previously connected to the communication device;
   means for transmitting a connection request to the external device designated by the first identification information when the communication device is in the first communication mode;
   means for transmitting a connection request to the external device designated by the second identification information when the communication device is in the second communication mode;
   means for establishing connection with the external device designated by either one of the first identification information or the second identification information stored in said memory; and
   means for reproducing data transmitted from the external device with which the connection is established by the establishing means via the communication device.

14. An electronic apparatus according to claim 13, wherein either one of the first identification information or the second identification information includes address information allocated to the external device.

15. An electronic apparatus according to claim 13, wherein setting means sets the communication device in either one of a first communication mode for receiving data transmitted from the external device or the second communication mode for bidirectionally transmitting and receiving data between the external device and the communication device.

16. An electronic apparatus according to claim 13, wherein the data transmitted from the external device is audio data, and said reproducing device includes an output unit which outputs sounds corresponding to the audio data.

* * * * *